(12) United States Patent
Shitikov

(10) Patent No.: US 10,547,060 B2
(45) Date of Patent: Jan. 28, 2020

(54) DOWNHOLE MUD POWERED BATTERY

(71) Applicant: SCHLUMBERGER TECHNOLOGY CORPORATION, Sugar Land, TX (US)

(72) Inventor: Vladimir Shitikov, Sceaux (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 713 days.

(21) Appl. No.: 15/010,075

(22) Filed: Jan. 29, 2016

(65) Prior Publication Data

US 2016/0226080 A1    Aug. 4, 2016

(30) Foreign Application Priority Data

Jan. 30, 2015   (EP) .................................... 15290021

(51) Int. Cl.
*H01M 6/34* (2006.01)
*E21B 41/00* (2006.01)
(Continued)

(52) U.S. Cl.
CPC ........... *H01M 6/34* (2013.01); *E21B 41/0085* (2013.01); *H01M 4/0402* (2013.01);
(Continued)

(58) Field of Classification Search
CPC .................. H04Q 9/00; H04Q 2209/40; H04Q 2209/823; G01R 31/3658; H01M 10/48; H01M 10/4257; H01M 10/0525; H01M 10/486; H01M 2010/4271; H01M 6/34; H01M 4/466; H01M 4/364; H01M 4/0402; H01M 4/0471; H01M 4/42; H01M 4/366; H01M 4/38; H01M 6/103; H01M 4/08; H01M 4/582; H01M 2210/10;
(Continued)

(56) References Cited

U.S. PATENT DOCUMENTS 2,622,339 A  * 12/1952 Hewitt, Jr. .......... E21B 41/0085
                                                      174/564
3,293,078 A    12/1966 Frye
(Continued)

FOREIGN PATENT DOCUMENTS

FR         1307965 A    11/1962
GB          577165 A     6/1931
(Continued)

OTHER PUBLICATIONS

Extended European Search Report issued in related EP application 16000213.5 dated Jun. 2, 2016, 8 pages.

*Primary Examiner* — Gary D Harris
(74) *Attorney, Agent, or Firm* — Cameron R. Sneddon

(57) ABSTRACT

Methods, systems, and devices for powering downhole tools with an electrochemical device are provided. A downhole power system includes an electrochemical device having an anode and a cathode. The power system includes a downhole tool electrically communicating with the electrochemical device to provide electrical power to the downhole tool. The electrochemical device is activated when immersed in a downhole fluid and inactive when not immersed in the downhole fluid, the downhole fluid functioning as an electrolyte.

10 Claims, 1 Drawing Sheet

(51) Int. Cl.
  *H01M 4/58* (2010.01)
  *H01M 4/04* (2006.01)
  *H01M 4/36* (2006.01)
  *H01M 4/38* (2006.01)
  *H01M 4/42* (2006.01)
  *H01M 4/46* (2006.01)
  *H01M 4/02* (2006.01)

(52) U.S. Cl.
  CPC ......... *H01M 4/0471* (2013.01); *H01M 4/364* (2013.01); *H01M 4/366* (2013.01); *H01M 4/38* (2013.01); *H01M 4/42* (2013.01); *H01M 4/466* (2013.01); *H01M 4/582* (2013.01); *H01M 2004/027* (2013.01); *H01M 2004/028* (2013.01); *H01M 2220/10* (2013.01)

(58) Field of Classification Search
  CPC ..... H01M 2004/027; H01M 2004/028; H01M 4/661; H01M 4/54; H01M 4/72; H01M 4/667; E21B 41/0085

USPC .......................................................... 429/90
  See application file for complete search history.

(56) References Cited

U.S. PATENT DOCUMENTS

2007/0044960 A1* 3/2007 Lovell ................... E21B 17/206
                                                    166/250.07
2013/0029241 A1* 1/2013 Mason ................ E21B 41/0085
                                                    429/436

FOREIGN PATENT DOCUMENTS

WO       87/07085 A1    11/1987
WO       03/010413 A1    2/2003

* cited by examiner

DOWNHOLE MUD POWERED BATTERY

BACKGROUND

Field

This disclosure relates to electrochemical devices that convert chemical energy to electrochemical current, and more specifically, to an electrochemical device that may be employed under extreme conditions.

Description of the Related Art

Increasing worldwide energy demands as well as depletion of more easily accessible oilfield reservoirs have pushed exploration to more harsh or extreme environments, such as deep water, as well as geothermal energy drilling. These harsh environments generally involve high pressure and/or high temperature conditions. High pressure and/or high temperature conditions often impose more stringent demands for devices powering downhole equipment. Lithium type batteries have been a power source widely used in oilfield downhole exploration. Many electrical tools in the downhole environment are powered by batteries, and specifically Lithium Thyonil Chloride (LTC) batteries. These batteries are very efficient but can be dangerous to operate and transport. Moreover, depleted battery disposal may be a very demanding process involving strict regulations and procedures.

Downhole batteries and electrical power systems have to withstand extreme temperatures in the downhole environment. Lithium batteries, however, may not be available at high temperatures given the low melting temperature of lithium; such physical properties tend to limit the operational temperature of these types of batteries to less than 200° C. Exceeding these limits with a lithium based battery may result in battery malfunction, performance degradation, and potential battery explosion.

In order to design a battery to withstand high temperatures and high pressures using typical battery technology, several engineering compromises may be used. During the battery discharge, especially at high temperature, gas is created inside the battery. Empty space in the battery housing should be designed for the gas expansion. This empty space reduces the battery useful active volume, while still increasing overall battery size for a desired voltage output. Because of this potential gas creation, battery handling can be dangerous, often involving strict procedures. Additionally, a battery housing is designed so that the battery is not subjected to the well pressure and fluids. Exposure to such high pressures and downhole fluids would typically cause the battery to rupture and/or explode. LTC batteries are sometimes limited to 200° C. because of the lithium/manganese alloy melting point. Thus, there is a need for a battery and battery powered downhole tools that can withstand high downhole pressures and temperatures, and yet do not involve special care for transportation and disposal.

SUMMARY

Certain aspects of some embodiments disclosed herein are set forth below. It should be understood that these aspects are presented merely to provide the reader with a brief summary of certain forms the embodiments might take and that these aspects are not intended to limit the scope of the disclosure. Indeed, the disclosure may encompass a variety of aspects that may not be set forth below.

In some embodiments, a downhole power system includes an electrochemical device having an anode and a cathode. The power system includes a downhole tool electrically communicating with the electrochemical device to provide electrical power to the downhole tool. The electrochemical device is activated when immersed in a downhole fluid and inactive when not immersed in the downhole fluid, the downhole fluid functioning as an electrolyte.

In some embodiments, a downhole battery includes a cathode and a magnesium or zinc based anode. A separator, made out of a high temperature resistant material, physically and electrically isolates the cathode and anode. The battery is inactive when not immersed in a downhole fluid and activated when immersed in the downhole fluid, the downhole fluid functioning as an electrolyte.

In some embodiments, a method of forming a high temperature downhole fluid activated battery includes forming a cathode assembly. Forming the cathode assembly includes annealing a salt comprising silver chloride (AgCl) to create a high temperature ingot of silver chloride. Non-conductive plates of AgCl are formed from the ingot. Forming the cathode assembly also includes coating the plates with silver (Ag), bonding the plates to a silver plated copper grid sheet, and rolling the sheet into a spiral or scroll shape. The method also includes coupling the cathode assembly to a high temperature resistant separator, coupling the separator and cathode assembly to an anode having a tube shape, and electrically bonding an anode conductor to the anode tube and a cathode conductor to the cathode assembly.

BRIEF DESCRIPTION OF THE DRAWINGS

So that the manner in which the above recited features can be understood in detail, a more particular understanding may be had when the following detailed description is read with reference to certain embodiments, some of which are illustrated in the appended drawings in which like characters represent like parts throughout the drawings. It is to be noted, however, that the appended drawings illustrate only some embodiments and are therefore not to be considered limiting of its scope, and may admit to other equally effective embodiments.

DETAILED DESCRIPTION

In the following description, numerous details are set forth to provide an understanding of the present disclosure. It will be understood by those skilled in the art, however, that the embodiments of the present disclosure may be practiced without these details and that numerous variations or modifications from the described embodiments may be possible.

In the specification and appended claims: the terms "connect", "connection", "connected", in "connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the disclosure.

Figure 1:
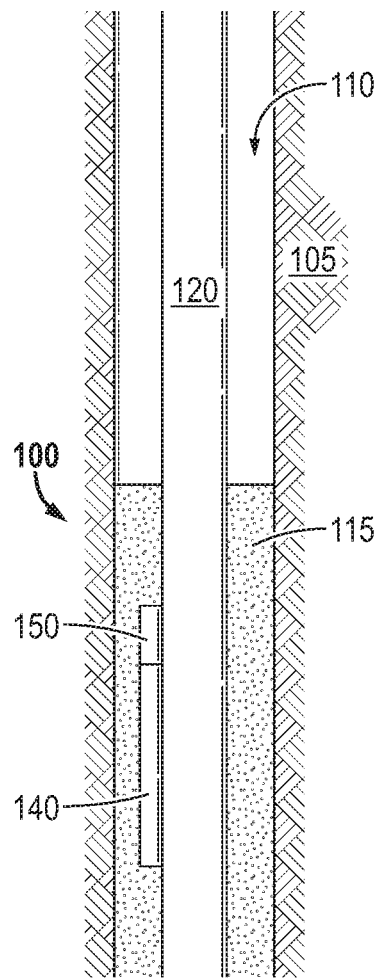
FIG. 1 shows a schematic cross-sectional view of a downhole power system according to some embodiments of the disclosure.

Methods, systems, and devices are disclosed herein for powering downhole tools and systems, either in a downhole well or other environments where the device would be useful. FIG. 1 shows a downhole power system 100 that includes an electrochemical device 140 and a downhole tool 150 electrically communicating with the electrochemical device 140 to provide electrical power to the downhole tool 150. The downhole tool 150 may be a gauge for measuring downhole properties such as temperature and pressure. Other downhole tools that may rely on the electrochemical device 140 for power may also be used, such as downhole fluid samplers, wireless acoustic telemetry devices, electrically activated flow valves, smart sensors such as downhole flow meters, electrically activated well perforating devices, etc. The downhole tool 150 may be coupled electrically, physically, or both with tubing 120 placed downhole to perform various operations, such as well testing operations. The tubing 120 is positioned within a wellbore 110 penetrating a formation 105.

Downhole fluid 115, such as drilling fluids, muds, brines, etc., fills the wellbore 110 and may circulate from the bottom of the wellbore to the wellbore surface. Hydrocarbons from the formation may also be circulating within the tubing 120 and flow towards the wellbore surface during various stages of a well test or other downhole operation. The electrochemical device 140 is activated when immersed in the downhole fluid 115 and inactive when not immersed in the downhole fluid 115, such as when the downhole tool 150 and/or electrochemical device 140 are stored at the surface before and after use. The downhole fluid 115 thus functions as an electrolyte for the electrochemical device 140. To aid in understanding how the electrochemical device may be activated when immersed in downhole fluid 115 and inactive when not immersed in downhole fluid 115, FIG. 2 illustrates an electrochemical device 140, such as a battery 200.

Figure 2:
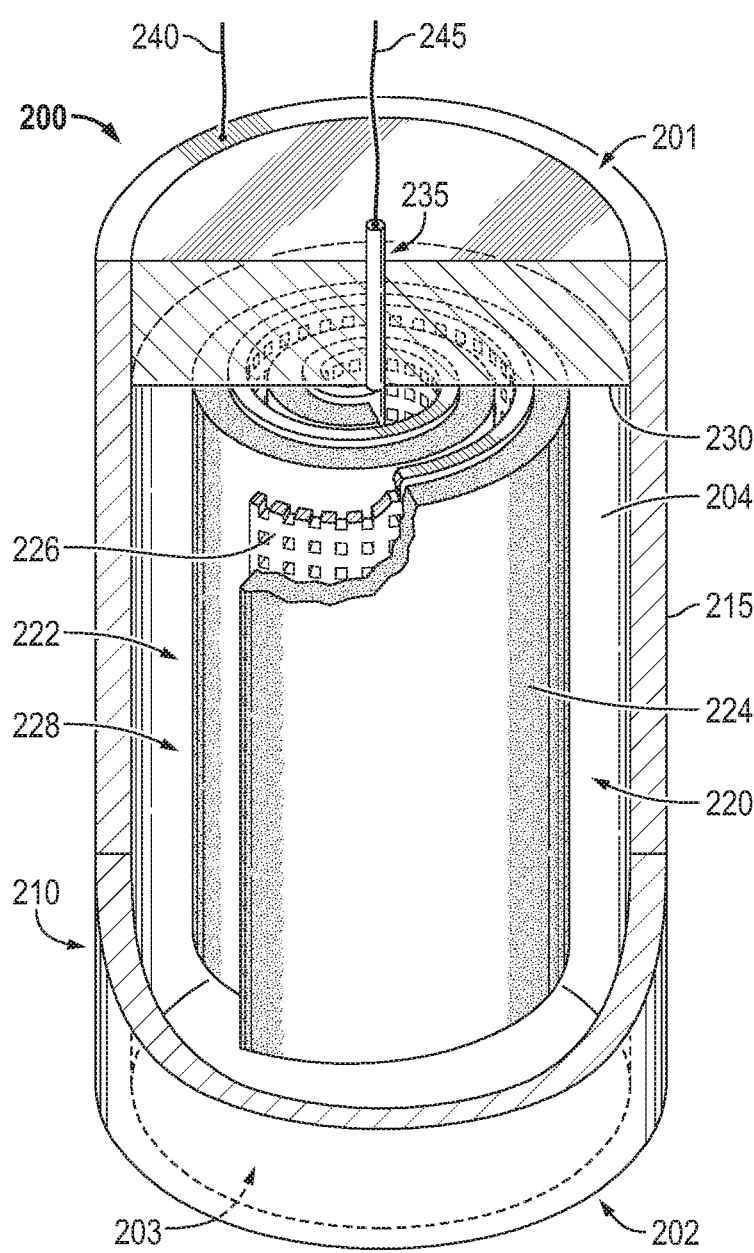
FIG. 2 shows a cross-sectional view of an electrochemical device according to some embodiments of the disclosure.

During exploration and production operations, downhole tools may be powered by the electrochemical device 140, such as a battery 200 as shown in FIG. 2. The battery 200 has an anode 210 and a cathode 220. The anode material may be formed from magnesium (Mg) and/or zinc (Zn). The anode 210 may also be formed in a tube shape and act as the battery housing. In some embodiments, the anode 210 comprises a magnesium tube 215.

Cathode 220 may comprise a cathode assembly 222 formed with one or more cathode plates 224 bonded to a support sheet, such as support grid sheet 226. In some embodiments the support sheet is not a grid nor does it have any openings there through, but is a continuous sheet of material. In some embodiments, the cathode assembly 222 is rolled together to form a scroll shape 228. Various materials may be used to form the cathode 220, such as at least one of silver (Ag), silver chloride (AgCl), silver oxide (AgO), copper chloride (CuCl), and lead chloride ($PbCl_2$). In some embodiments, the cathode plate 224 may be made of silver chloride sheet that is silver coated or plated. The support grid sheet 226 may be made of a copper material that is silver plated or silver coated.

A separator 230 physically and electrically isolates the anode 210 and cathode 220. In some embodiments, the separator 230 couples an anode 210 (e.g. magnesium tube 215) with the cathode assembly 222 at a first end 201 of the downhole battery 200. A second end 202 of the downhole battery 200 may have an opening 203 to allow the downhole fluid 115 to enter a cavity 204 formed within the magnesium tube 215, thereby activating the downhole battery. In some embodiments, the opening 203 may be at some other location along the battery housing/magnesium tube 215. In some embodiments, the battery housing may have multiple openings in order to permit downhole fluids 115 to fill in and occupy space between the anode 210 and cathode 220 in order to provide the electrolyte for the battery 220, thereby activating battery 220. Some downhole fluids 115 that may be used to function as an electrolyte for battery 200 include at least one of brines, drilling mud, and drilling fluids. The downhole fluid may be a chlorine based salt brine, such as NaCl, KCl, and other chlorine based salts. The brine may have a 3% or greater salt solution, such as 30%.

The cathode assembly 222 is positioned within the cavity 204. An anode conductor 240 may be electrically coupled to the anode 210 and also the downhole tool 150. A cathode conductor 245 may also be electrically coupled to the cathode 220. The separator may also provide a feedthrough 235 for the cathode conductor 245, allowing the cathode conductor 245 to be electrically coupled with the downhole tool 150. The separator may be formed out of a high temperature resistant material that may include at least one of poly ether ether ketones (PEEK), polyimide, LCP, poly phenylene sulfide (PPS), polytetrafluoroelethlyenes (teflons), and other high temperature polymers.

The battery 200 functions at temperatures ranging from −2 to 250° C. Indeed, the batter 200 functions at high temperatures beyond 100° C. without a specially isolated electrolyte, such as from 100° C. to 250° C. and from 200° C. to 230° C. Pressurized fluid, such as is found in downhole systems, does not boil at these high temperatures making the downhole fluid 115 a possible electrolyte to activate the battery 200, even in high temperature and high pressure conditions.

Methods for forming a high temperature downhole fluid activated battery 200 will now be described. The cathode assembly 222 may be formed by annealing a salt comprising silver chloride (AgCl) at temperatures around 550-600° C. The melted salt grains create a solid high temperature ingot of silver chloride (AgCl). Because AgCl is a malleable material, the ingot may be converted into thin sheets or plates down to 1 mm to 0.1 mm in thickness. As AgCl is non-conductive, the sheets or plates formed from the ingot are also non-conductive. Next, the AgCl plates 224 are coated with silver (Ag), such as by electroplating in a photographic solution, to create a conductive layer on the AgCl plates. The end result is a thin AgCl sheet or plate 224 covered with silver on its surface.

The silver coated AgCl plates 224 are then bonded to a silver plated or coated copper grid sheet 226 using high temperature conductive glue, or other like methods and materials. The resulting cathode structure provides additional mechanical strength and helps improve the electrical connection between the plates 224 and copper grid sheet 226. The cathode structure, plates 224 and grid sheet 226, are then rolled together to form a cathode assembly 222 having a spiral or scroll shape 228. The support grid sheet 226 and the one or more cathode plates 224 are rolled together to form the scroll shape, which shape increases the active area per volume while enabling the cathode structure to fit within the tube 215.

The cathode assembly 222 is coupled to a high temperature resistant separator 230. The cathode assembly 222 is positioned within cavity 204 formed within the anode tube 215, wherein the separator 230 couples the anode tube 215 with the cathode assembly 222 to form a first end 201 of the downhole fluid battery 222. A second end 202 of the downhole battery 200 includes an opening 203 to allow the downhole fluid 215 to enter the cavity 204 thereby activating the downhole battery 200. The separator 230 and cathode assembly 222 are coupled to the anode 210 having a tube shape 215 in a manner that electrically isolates the cathode 220 from the anode 210. The anode conductor 240 is then electrically bonded to the anode tube 215. The cathode conductor 245 passes through an aperture or feedthrough 235 in the separator 230 and is electrically bonded to the cathode assembly 222.

Thus, some embodiments of the disclosure provide a downhole fluid activated battery to power downhole tools, the battery having an open housing that communicates with the well annulus, enabling the battery to work in almost any possible downhole pressure and temperature. Potentially dangerous internal pressures and temperatures within the battery housing may be non-existent as the battery housing is open to the downhole environment. Thus, battery handling and storage may be simplified, providing potential cost savings, since the battery is "dry" prior to its use and then filled with relatively harmless electrolyte, i.e. downhole fluids already in use in order to activate the battery or electrochemical device.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. A downhole power system, comprising:
    an electrochemical device having an anode, a cathode, and space between the anode and cathode; and
    a downhole tool electrically communicating with the electrochemical device to provide electrical power to the downhole tool when the electrochemical device is activated, wherein the electrochemical device is activated when immersed in a downhole fluid, such that downhole fluid is in the space between and connecting the anode and cathode, and inactive when not immersed in the downhole fluid, wherein the downhole fluid functions as an electrolyte.

2. The downhole power system of claim 1, wherein the anode material comprises at least one of magnesium (Mg) and zinc (Zn).

3. The downhole power system of claim 2, wherein the anode comprises a magnesium tube.

4. The downhole power system of claim 1, wherein the cathode comprises:
    one or more cathode plates bonded to a support grid sheet, thereby forming a cathode assembly, the cathode assembly rolled together to form a scroll shape.

5. The downhole power system of claim 1, wherein the cathode material comprises at least one of silver (Ag), silver chloride (AgCl), silver oxide (AgO), copper chloride (CuCl), and lead chloride ($PbCl_2$).

6. The downhole power system of claim 4, wherein the cathode plate comprises a silver plated silver chloride sheet.

7. The downhole power system of claim 6, wherein the support grid sheet comprises a silver plated copper grid sheet.

8. The downhole power system of claim 1, wherein the downhole fluid comprises a drilling fluid having a chlorine (Cl) based salt brine.

9. The downhole power system of claim 1, wherein the electrochemical device operates at temperatures ranging from −2 to 250° C.

10. The downhole power system of claim 9, wherein the operating temperature ranges from 200° C. to 230° C.

* * * * *